United States Patent
Perrier

(10) Patent No.: US 9,796,202 B2
(45) Date of Patent: Oct. 24, 2017

(54) METHOD AND SYSTEM FOR MANUFACTURING INTAGLIO PRINTING PLATES FOR THE PRODUCTION OF SECURITY PAPERS

(75) Inventor: Jacques Perrier, Commugny (CH)

(73) Assignee: KBA-NotaSys SA, Lausanne (CH)

( * ) Notice: Subject to any disclaimer, the term of this patent is extended or adjusted under 35 U.S.C. 154(b) by 935 days.

(21) Appl. No.: 12/992,522

(22) PCT Filed: May 5, 2009

(86) PCT No.: PCT/IB2009/051838
§ 371 (c)(1),
(2), (4) Date: Nov. 12, 2010

(87) PCT Pub. No.: WO2009/138901
PCT Pub. Date: Nov. 19, 2009

(65) Prior Publication Data
US 2011/0068509 A1    Mar. 24, 2011

(30) Foreign Application Priority Data
May 16, 2008 (EP) .................................... 08156392

(51) Int. Cl.
*B23K 26/00* (2014.01)
*B41N 3/00* (2006.01)
(Continued)

(52) U.S. Cl.
CPC ............ *B41N 3/003* (2013.01); *B23K 26/702* (2015.10); *B41C 1/05* (2013.01); *B41M 1/10* (2013.01); *B41M 3/14* (2013.01); *B41N 1/06* (2013.01)

(58) Field of Classification Search
CPC .......... B23K 26/702; B41C 1/05; B41M 1/10; B41M 3/14; B41N 1/06; B41N 3/003
(Continued)

(56) References Cited

U.S. PATENT DOCUMENTS

| 3,636,251 | A | 1/1972 | Daly et al. |
| 4,347,785 | A | 9/1982 | Chase et al. |

(Continued)

FOREIGN PATENT DOCUMENTS

| EP | 0091709 | 10/1983 |
| EP | 0351366 | 1/1990 |

(Continued)

OTHER PUBLICATIONS

Deinhammer, Harald et al., "Direct Laser Engraving of Intaglio Printing Plates," Proceedings of the SPIE, vol. 5310 (2004) pp. 184-193.

(Continued)

*Primary Examiner* — Sang Y Paik
(74) *Attorney, Agent, or Firm* — Seager, Tufte & Wickhem LLP

(57) ABSTRACT

There is described a method for manufacturing intaglio printing plates for the production of security papers, wherein a laser beam (2) is used to engrave intaglio printing patterns (3, 3.1, 3.2, 3.3) directly into the surface of a laser-engravable, especially metallic, printing plate medium (1), wherein laser engraving of the printing plate medium (1) is carried out layer by layer in several individual engraving steps performed one after the other in register so that the intaglio printing patterns (3, 3.1, 3.2, 3.3) are gradually engraved into the surface of the printing plate medium (1) up to desired engraving depths, the surface of the engraved printing plate medium (1) being cleaned from residues of the laser engraving process following and between each individual engraving step.

22 Claims, 11 Drawing Sheets

(51) Int. Cl.
  *B41C 1/05* (2006.01)
  *B23K 26/70* (2014.01)
  *B41M 1/10* (2006.01)
  *B41M 3/14* (2006.01)
  *B41N 1/06* (2006.01)

(58) Field of Classification Search
  USPC ............... 219/121.6–121.85; 358/3.29–3.32; 101/150
  See application file for complete search history.

(56) References Cited

U.S. PATENT DOCUMENTS

| | | | |
|---|---|---|---|
| 4,516,496 A | | 5/1985 | Giori |
| 5,006,694 A | * | 4/1991 | Handke et al. ............ 219/121.6 |
| 5,042,378 A | | 8/1991 | Germann |
| 5,062,359 A | | 11/1991 | Giori |
| 5,062,360 A | | 11/1991 | Germann et al. |
| 5,149,937 A | | 9/1992 | Babel et al. |
| 5,282,417 A | | 2/1994 | Germann |
| 5,540,146 A | | 7/1996 | Lapp |
| 5,899,145 A | | 5/1999 | Schaede |
| 6,285,001 B1 | * | 9/2001 | Fleming et al. ......... 219/121.72 |
| 6,511,784 B1 | | 1/2003 | Hiller et al. |
| 6,840,721 B2 | | 1/2005 | Kaule et al. |
| 6,857,365 B2 | * | 2/2005 | Juffinger et al. ........... 101/401.1 |
| 7,011,020 B2 | | 3/2006 | Dunninger et al. |
| 7,464,642 B2 | | 12/2008 | Schaede |
| 7,806,051 B2 | | 10/2010 | Schaede |
| 2001/0043842 A1 | | 11/2001 | Kaule et al. |
| 2002/136969 A1 | | 9/2002 | Hiller et al. |
| 2003/0149507 A1 | | 8/2003 | Pierozzi |
| 2004/0168595 A1 | | 9/2004 | Beisswenger et al. |
| 2004/0232108 A1 | | 11/2004 | Giori |
| 2004/0237816 A1 | | 12/2004 | Dunninger et al. |
| 2006/0144265 A1 | | 7/2006 | Dunninger et al. |
| 2006/0162591 A1 | | 7/2006 | Schaede |
| 2006/0243146 A1 | | 11/2006 | Schaede |
| 2006/0254444 A1 | | 11/2006 | Mayerhofer et al. |
| 2007/0107252 A1 | | 5/2007 | Kruckenhauser et al. |
| 2007/0181016 A1 | | 8/2007 | Schaede |
| 2007/0204755 A1 | | 9/2007 | Moreau |
| 2007/0254242 A1 | | 11/2007 | Teltschik (former Hiller) et al. |
| 2009/0059304 A1 | | 3/2009 | Manfredi et al. |
| 2009/0223927 A1 | | 9/2009 | Giori et al. |

FOREIGN PATENT DOCUMENTS

| | | |
|---|---|---|
| EP | 0406157 | 1/1991 |
| EP | 0415881 | 3/1991 |
| EP | 0563007 | 9/1993 |
| EP | 0683123 | 11/1995 |
| EP | 0873866 | 10/1998 |
| EP | 1262315 | 12/2002 |
| EP | 1334822 | 8/2003 |
| EP | 1369230 | 12/2003 |
| EP | 1400353 | 3/2004 |
| EP | 1442878 | 8/2004 |
| EP | 1445098 | 8/2004 |
| EP | 1529637 | 5/2005 |
| EP | 1580015 | 9/2005 |
| EP | 1580020 | 9/2005 |
| EP | 1602482 | 12/2005 |
| EP | 1602483 | 12/2005 |
| GB | 2048785 | 12/1980 |
| JP | 63-157778 A | 6/1988 |
| JP | 2000033434 A | 2/2000 |
| JP | 2001071451 A | 3/2001 |
| JP | 2004066579 A | 3/2004 |
| JP | 2011521805 A | 7/2011 |
| RU | 2086378 C1 | 8/1997 |
| WO | 97/48555 | 12/1997 |
| WO | 03/047862 | 6/2003 |
| WO | 03/103962 | 12/2003 |
| WO | 2004/101282 | 11/2004 |
| WO | 2005/002869 | 1/2005 |
| WO | 2005/077656 | 8/2005 |
| WO | 2005/090090 | 9/2005 |
| WO | 2006/045128 | 5/2006 |
| WO | 2007/119203 | 10/2007 |

OTHER PUBLICATIONS

Deinhammer, Harald et al., "The Implication of Direct Laser Engraved Intaglio Plates on Banknote Security," Proceedings of the SPIE, vol. 6075 (2006) pp. 607503-1-607503-11.

"Handbook of Print Media," Helmut Kipphan (Ed.), ISBN 3-540-67326-1, Springer-Verlag, copyright 2001, Chapter 1.3.2.2, pp. 48-53 and Chapter 2.2, pp. 360-394.

* cited by examiner

FOURTH ENGRAVING STEP

FIFTH ENGRAVING STEP

SIXTH ENGRAVING STEP

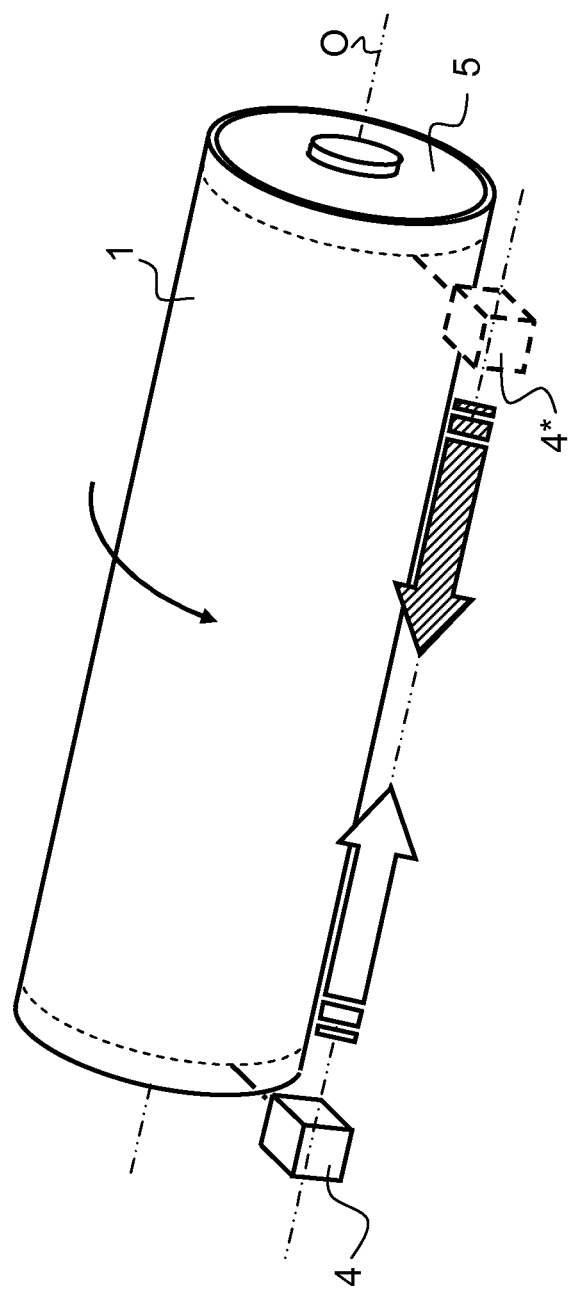

METHOD AND SYSTEM FOR MANUFACTURING INTAGLIO PRINTING PLATES FOR THE PRODUCTION OF SECURITY PAPERS

TECHNICAL FIELD

The present invention generally relates to the field of intaglio printing as applied for the production of security papers, including banknotes, duty stamps, banderols or labels, identification or travel documents, etc.

The present invention more precisely relates to a method and system for manufacturing intaglio printing plates for intaglio printing of sheets or webs of security papers, which method and system are based on the direct laser engraving of a printing plate medium, especially a metallic printing plate medium.

BACKGROUND OF THE INVENTION

The manufacturing of intaglio printing plates for the production of securities by direct laser engraving is already know in the art.

International application No. WO 97/48555 A1 for instance discloses a method for the direct engraving of a metallic printing plate medium wherein a precision engraving tool, such as a laser engraving tool, is guided in such a way as to follow a determined tool track located within a desired contour and with a desired penetration depth to remove material from the printing plate medium within the desired contour at the desired depth. This engraving process is essentially vectorial in that the laser engraving tool follows a determined tool trajectory corresponding to the intaglio printing patterns to be engraved.

European patent application No. EP 1 334 822 A2 discloses a method and installation for the direct laser engraving of intaglio printing plates or cylinders wherein engraving is performed by means of a laser beam generated by a pulsed Nd-YAG laser device. A laser-engravable printing plate medium is mounted onto a motor-driven platform capable of moving along two Cartesian axes and which is controlled by a computer, which computer also controls operation and actuation of the pulsed laser device. The pulsed laser device is mounted so as to be vertically moveable and the height thereof with respect to the platform is adjustable by means of a motor controlled by the computer so as to correct and adjust focusing of the laser beam onto the plate to be engraved. An optical system with galvanometric motors is used to guide the laser beam on a focal lens that concentrates the laser beam on a desired point within a determined engraving area that covers only a limited part of the whole printing plate surface. The pulsed laser device is specifically designed to generate pulses whose power is largely higher than the power of ordinary continuously-operated laser devices. One disadvantage of this solution resides in the fact that the engraving process involves a repetitive local processing to engrave the whole area of the printing plate, an engraving area of the order of 100 mm×100 mm being treated at a time. An optical system with appropriate focal length is provided to process each desired location within the engraving area. The angle of incidence of the laser beam with respect to the surface of the printing plate thus varies according to the position of the laser beam with respect to the locations of the engraving area being engraved, thereby potentially affecting engraving uniformity. Such processing moreover requires a very high accuracy so that no overlaps or gaps appear between adjacent engraving areas.

International application No. WO 2006/045128 A1 discloses a direct laser engraving system for the production of intaglio printing plates that follows a similar approach to the one described in the above-mentioned European patent application No. EP 1 334 822 A2, i.e. the laser-engravable printing medium is similarly mounted onto a movable x-y platform, while a laser device is controlled to engrave a limited area of the printing plate surface. Further details about this direct laser engraving system may be found in the article of Messrs. Harald Deinhammer, Daniel Schwarzbach, Rudolf Kefeder and Peter Fajmann entitled "The implication of direct laser engraved intaglio printing plates on banknote security", Proceedings of SPIE, Vol. 6075, 2006, 607503-1 to 607503-11 (hereinafter referred to as Deinhammer2006). The engraving area of this other system is of about 70 mm×70 mm, which implies that only a limited part of the intaglio printing patterns might be engraved at a time and that the engraving process must be repeated with high accuracy so that no visible overlaps or gaps are formed between adjacent engraving areas. As disclosed in International application No. WO 2006/045128 A1, this implies performing a calibration operation at regular intervals which is cumbersome and time-consuming.

A further disadvantage of the direct laser engraving system of International application No. WO 2006/045128 A1 again resides in the fact that the angle of incidence of the laser beam with respect to the printing plate surface varies according to the position of the laser beam with respect to the locations of the engraving area being treated, which potentially leads to engraving non-uniformities which shall be avoided.

Yet another disadvantage of this direct laser engraving system (which also characterizes the approach disclosed in International application No. WO 97/48555 A1) resides in the fact that the data used to control the laser engraving device is essentially based on vectorized graphic data. This implies that engraving times will increase with design complexity as discussed in Deinhammer2006.

Further discussion regarding the direct laser engraving of intaglio printing plates might further be found in International application No. WO 2005/002869 A1 and the related article of Messrs. Harald Deinhammer, Franz Loos, Daniel Schwarzbach and Peter Fajmann entitled "Direct Laser Engraving of Intaglio Printing Plates", Proceedings of SPIE, Vol. 5310, 2004, pp. 184-193 (hereinafter referred to as Deinhammer2004). According to International application No. WO 2005/002869 A1, the printing plate, which is made of or has an outer layer consisting of brass or an alloy thereof, is engraved directly by laser and, once fully engraved, is subjected to a cleaning process to remove the melted residues of the laser engraving process, which cleaning process involves a chemical treatment in a chemical bath of acidic solution, before being ultimately polished and chromed. A dry-ice pre-cleaning of the surface of the engraved printing plate by spraying of solid carbon-dioxide pellets may be performed prior to the chemical treatment of the engraved plate (see again Deinhammer2006). The proposed chemical post-engraving treatment of the engraved printing plate, as well as the dry-ice pre-cleaning, is rather aggressive and can lead to a degradation of the desired intaglio engravings if it is not controlled and carried out properly. The post-engraving processing with dry-ice pre-cleaning and treatment with acidic solution are furthermore prejudicial as they could lead to engraving non-uniformities and lack of repeatability, namely differences between two intaglio printing plates produced from a same design.

International application No. WO 03/103962 A1 in the name of the present Applicant, which is incorporated herein by reference in its entirety, discloses a different approach to the manufacture of engraved plates for the production of intaglio printing plates. While the intaglio design to be engraved is conceived on a computer assisted design system using vectorized graphics and/or bitmap graphics, the final intaglio design is converted into a so-called depth-map that basically consists of three-dimensional pixel data representative of the intaglio printing patterns to engrave and where the "intensity" of each pixel is representative of the depth to be engraved at the corresponding location of the printing plate. A laser engraving device is then controlled based on this depth-map to perform a series of successive elementary engraving steps corresponding to each pixel of the depth-map. A typical resolution of engraving can be as high as 8000 dpi, which amounts to a distance between two successive elementary engraving steps of approximately 3 microns. A printing plate can be thus engraved by a laser beam based on the generated depth-map to produce engravings into the printing plate surface.

A substantial advantage of this approach resides in the fact that the various design elements forming the whole intaglio design to be engraved in the printing plate are not engraved individually, but rather all at once pixel by pixel. Furthermore, and in contrast to the above-mentioned approaches, the engraving times are independent of the complexity of the intaglio design and depend only on the maximum depth of the design to be engraved. This pixel by pixel approach further translates into greater flexibility and control regarding the engraving profile and the shape thereof.

The engraving method disclosed in International application No. WO 03/103962 A1 can in particular be put into practice to engrave highly complex intaglio printing patterns such as disclosed in International applications Nos. WO 2005/090090 A1 and WO 2007/119203 A1, also in the name of the present Applicant. The pixel-by-pixel engraving principle disclosed in WO 03/103962 A1 is particularly suitable to engrave the patterns discussed in International application No. WO 2007/119203 A1 which exhibit a high complexity and density of elements, and this with reasonably low engraving times. Illustrative intaglio-printed patterns are shown in FIGS. 1 and 2, which intaglio-printed patterns are analogous to those found on most intaglio-printed banknotes. FIG. 1 is an enlarged view of an eye portion of a portrait that can be found in International application No. WO 03/103962 A1, while FIG. 2 is an enlarged view of an eye portion of another portrait according to the teaching of International application No. WO 2007/119203 A1 wherein typical curvilinear intaglio-printed patterns are interlaced with micro-letters that are dimensionally modulated to produce variations in tones. These intaglio-printed patterns are typically formed of a complex arrangement of dimensionally modulated curvilinear elements that produce the desired halftones of the pictorial representation that one wishes to create on the security paper. The curvilinear elements typically have a line width of the order of 10 microns and more.

As discussed in International application No. WO 03/103962 A1, the pixel-by-pixel engraving method can either be put into practice to engrave a precursor of an intaglio printing plate, such as a polymer plate, which precursor is then used to produce any number of identical printing plates by a galvanic replication process, or to directly engrave a metallic plate that is ultimately used as the intaglio printing plate, typically after chroming of the surface thereof. Advantageously, the engraving process is carried out by mounting the laser-engravable printing medium on the circumference of a rotating cylinder and moving the laser engraving device in a direction parallel to the axis of the cylinder.

The laser engraving of polymer precursors of intaglio printing plates as taught in International application No. WO 03/103962 A1 has been successfully put into practice by the Applicant which has now sold a number of Computer to Intaglio Plate®, or CTiP®, systems to the banknote printing industry worldwide. Such CTiP® systems are now used by a substantial number of banknote pre-press centres around the world for the manufacture of intaglio printing plates for the production of banknotes and other security papers.

The laser engraving of polymer precursors of intaglio printing plates is advantageous over the direct laser engraving of printing plates in that engraving of a polymer precursor can be performed in a single pass and with a high engraving quality. Engraving of polymer precursors is accordingly particularly suited to the manufacture of high quality, high resolution intaglio printing plates for the production of banknotes.

Another advantage of the laser engraving of polymer precursors of intaglio printing plates resides in the fact that such precursors, once engraved, can be used to produce a so-called "Alto" by a galvanic process, which Alto can be used to produce a master (or original) printing plate used to replicate multiple absolutely identical intaglio printing plates or as "master Alto" to directly produce such multiple absolutely identical intaglio printing plates. Since the galvanic process is a very stable and homogenous process, the likelihood that differences occur between multiple printing plates which have been replicated from a same master is almost inexistent. Furthermore, the same printing plate materials as conventionally used in the industry can be exploited without this bearing any impact on the actual work of the printer operating the printing press.

Direct laser engraving of intaglio printing plates however has an advantage in terms of environmental requirements in that it enables to circumvent the galvanic process which makes use of environmentally unfriendly chemical agents.

Tests carried out by the Applicant have demonstrated that the direct laser engraving of printing plate mediums, especially metallic mediums, leads to the formation of residues which need to be removed to ensure proper engraving and printing quality. The amount of residues is directly dependent on the depth of the engravings and therefore increases with engraving depth. These amounts of residues become particularly critical to remove as soon as one wishes to form relatively deep engravings in the printing plate medium, especially engravings having a depth exceeding 50 microns (and even more critically above 100 microns).

While the particular choice of the printing plate material impacts on the formation of melted residues, such formation is unavoidable in the context of the direct laser engraving of intaglio printing plates and care should be taken to remove these residues while avoiding to degrade the quality of the desired engravings. This is again very critical when it comes to engraving deep intaglio printing patterns as substantial amounts of residues are produced that become difficult to remove.

This constitutes one of the reasons why it is proposed in Deinhammer2006 to perform a pre-cleaning operation of the surface of the engraving printing plate by spraying dry-ice pellets of carbon dioxide at low temperature (of the order of −80° C.) on the surface of the plate and then to subject the pre-cleaned printing plate to a chemical treatment in an acidic solution. As already mentioned, such operations are potentially prejudicial as they could lead to engraving non-uniformities. These cleaning operations can furthermore only be carried out once the printing plate has been fully engraved.

It has also been noticed that while the energy of the laser beam is well absorbed and converted into thermal energy in the first few micrometers of the material of the engraved printing plate medium, resulting in a local melting and evaporation of the material, the thermal energy is no longer directed and is spreading evenly in all direction into the material lower in the printing plate medium. As a result, higher laser energy do not only create deeper engravings, but also increased line widths (see again Deinhammer2004).

There is therefore a need for an improved method and system for the manufacture of intaglio printing plates wherein a laser beam is used to engrave intaglio printing patterns directly into the surface of a laser-engravable, especially metallic, printing plate medium.

SUMMARY OF THE INVENTION

A general aim of the invention is therefore to provide an improved method and system for manufacturing intaglio printing plates for the production of security papers, wherein a laser beam is used to engrave intaglio printing patterns directly into the surface of a laser-engravable printing plate medium A further aim of the invention is to provide such a method and system that improve the ability to shape the engraving profile of the intaglio printing patterns that one desires to engrave directly into the printing plate surface.

Still another aim of the invention is to provide such a method and system that enables to limit the formation of melted residues and facilitates the removal and cleaning thereof, while guaranteeing a high quality of engraving.

Yet another aim of the invention is to provide a solution that enables as much as possible to avoid resorting to the use of aggressive cleaning processes to remove the melted residues of the laser engraving process from the surface of the printing plate, which aggressive cleaning processes could negatively affect engraving uniformity and quality.

These aims are achieved thanks to the solution defined in the claims.

According to the invention, there is provided a method for manufacturing intaglio printing plates for the production of security papers, wherein a laser beam is used to engrave intaglio printing patterns directly into the surface of a laser-engravable, especially metallic, printing plate medium, wherein laser engraving of the printing plate medium is carried out layer by layer in several individual engraving steps performed one after the other in register so that said intaglio printing patterns are gradually engraved into the surface of the printing plate medium up to desired engraving depths, the surface of the engraved printing plate medium being cleaned from residues of the laser engraving process following and between each individual engraving step.

There is also provided a direct laser engraving system for carrying out the above method, namely a laser engraving system comprising a support element for mounting the laser-engravable printing plate medium, a laser engraving unit producing a laser beam that is directed towards the surface of the printing plate medium for engraving the surface of the printing plate medium layer by layer in several individual engraving steps and a cleaning unit for cleaning the surface of the engraved printing plate medium and removing residues therefrom following and between each individual engraving step.

Thanks to this solution, the engraving process is subdivided into a plurality of individual engraving steps which each involve removal of a limited quantity of material from the printing plate medium and accordingly limit the formation of residues. Furthermore, the surface of the engraved printing plate medium is cleaned following and between each individual engraving step such that the residues are removed before the next engraving step is performed, which ultimately improves engraving quality.

According to one embodiment, each individual engraving step results in a selective removal of a layer of material from the printing plate medium the thickness of which does not exceed a pre-selected maximum value. This pre-selected maximum value is preferably of between 10 to 15 microns.

According to another embodiment, cleaning of the surface of the engraved printing plate medium following and between each individual engraving step is performed mechanically, advantageously by means of a rotating brush that is moved over the surface of the engraved printing plate medium following and between each individual engraving step According to still another embodiment, the printing plate medium is mounted onto the circumference of a support cylinder which is rotated in front of a movable laser engraving unit producing a laser beam that is directed towards the surface of the printing plate medium, which laser engraving unit is movable parallel to the axis of rotation of the support cylinder.

According to yet another embodiment, the angle of incidence of the laser beam with respect to the surface of the printing plate medium being engraved is kept constant, thereby guaranteeing perfect engraving uniformity throughout the engraving process.

According to a further embodiment, a laser engraving unit producing a laser beam that is directed towards the surface of the printing plate medium is moved during each individual engraving step from a start position to an end position over the surface of the printing plate medium, and cleaning of the surface of the engraved printing plate medium is performed while the laser engraving unit, which is inoperative, is moved back from the end position to the start position.

Advantageously, in the context of the embodiment wherein the printing plate medium is mounted onto the circumference of a support cylinder as mentioned above, the laser engraving unit is moved during each individual engraving step from a start position to an end position step by step along the axis of rotation of the support cylinder so as to process successive annular portions of the surface of the printing plate medium, and cleaning of the surface of the engraved printing plate medium is performed while the laser engraving unit, which is inoperative, is moved back from the end position to the start position.

According to yet another embodiment, engraving of the surface of the printing plate medium is first performed by starting with the deepest intaglio printing patterns and gradually adding shallower intaglio printing patterns during subsequent engraving steps. This advantageously enables to preserve the shallower and finer intaglio printing patterns up to the final engraving steps, which shallower and finer intaglio printing patterns are more sensitive to the cleaning operations. This could be performed using an automatic focusing system to adjust focusing of the laser beam during individual engraving steps or by decomposing the engraving sequence in multiple engraving phases, each comprising one or more individual engraving steps, whereby only part of the desired intaglio printing patterns are engraved during each engraving phase.

Further advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIG. 10 is a schematic perspective view of the laser engraving system of FIG. 9 where only part of the components thereof have been illustrated.

DETAILED DESCRIPTION OF EMBODIMENTS OF THE INVENTION

Figure 1:
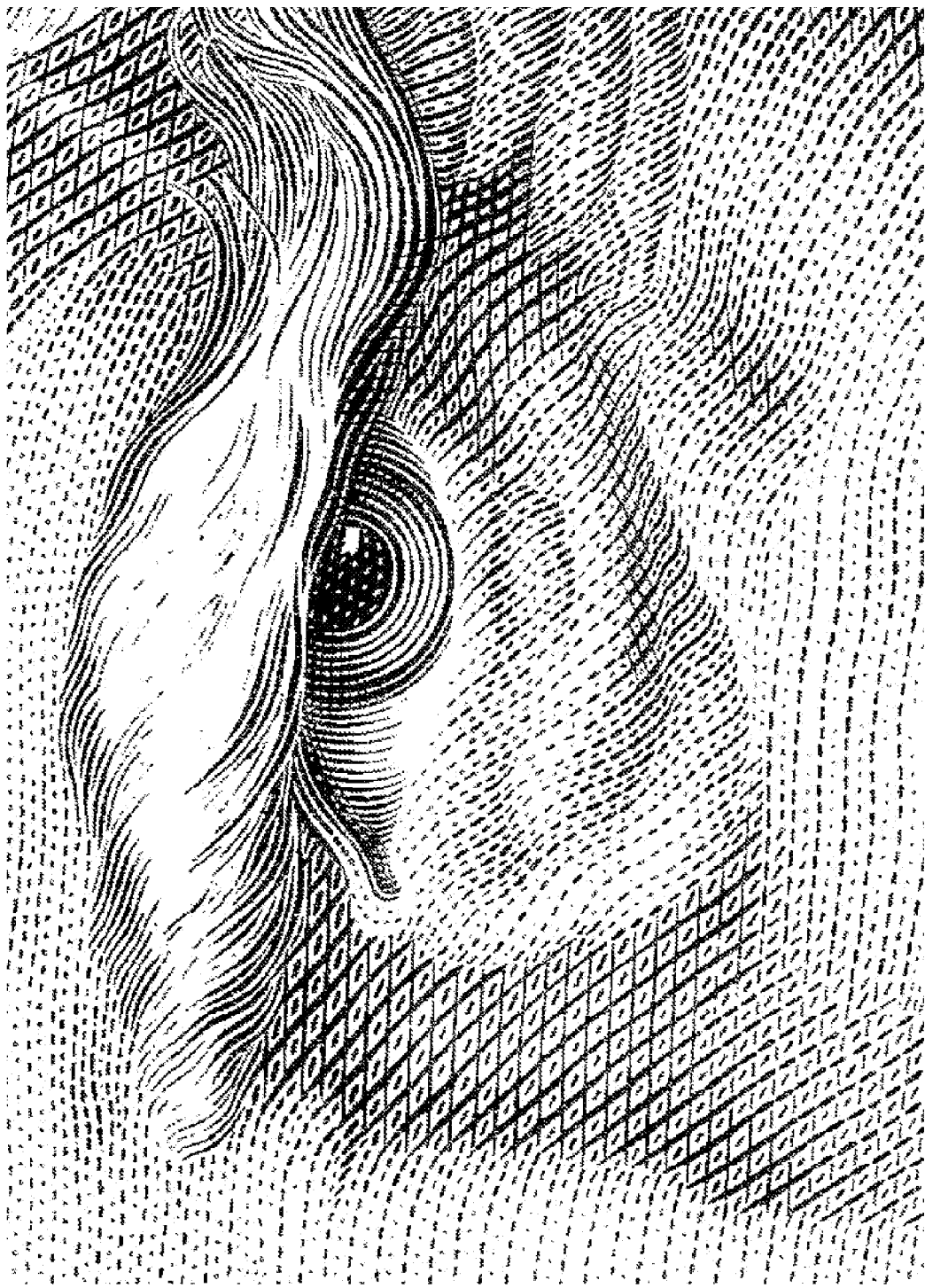
FIG. 1 is an enlarged view of an eye portion of a portrait realized by intaglio printing that can be found in International application No. WO 03/103962 A1.
Figure 2:
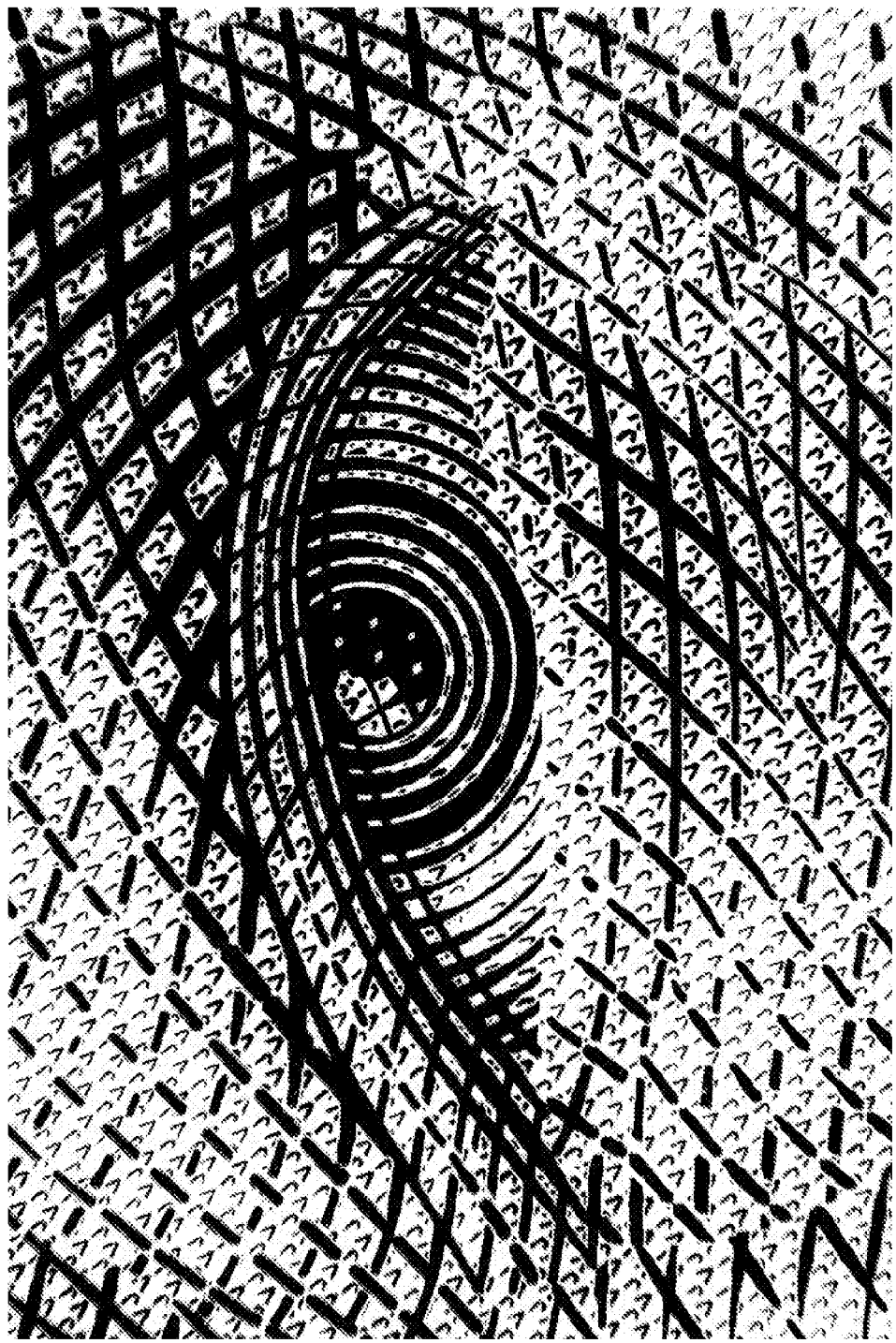
FIG. 2 is an enlarged view of an eye portion of another portrait realized by intaglio printing according to the teaching of International application No. WO 2007/119203 A1.

In the context of the present invention, "intaglio printing designs" or "intaglio printing patterns" shall be understood as referring to designs and patterns produced by engraving and which consist of an arrangement of multiple curvilinear elements of varying line width and engraving depth. Such intaglio printing designs and patterns produce characteristic printed designs and patterns on the printed product which are readily recognizable and are found on most security papers. Examples of such intaglio-printed designs and patterns are illustrated in FIGS. 1 and 2, which have already been discussed, as well as in FIG. 3 which is illustrative of an exemplary intaglio design that can be engraved in the form of corresponding intaglio printing patterns into an intaglio printing plate by direct laser engraving according to the invention. These illustrations are obviously purely illustrative and shall not be considered as limiting the scope of the present invention.

Intaglio printing designs and patterns produced according to the invention shall be distinguished from the designs and patterns used in the context of gravure printing (or rotogravure) where these merely consist of arrays of multiple cells of varying width and/or depth that are engraved into the surface of a cylinder, which cells are separated by cell walls. Gravure printing makes use of low viscosity inks that are allowed to flood above the cell walls so that the individual cells are no longer visible in the impression. The cells in gravure printing can typically be up to 50 microns deep (the cell depth being generally between 10 to 30 microns) and gravure printing does not produce any noticeable relief on the printed end-product. Details about gravure printing might be found in the "Handbook of Print Media" by Helmut Kipphan, Springer-Verlag, 2001, ISBN 3-540-67326-1 (see for instance chapter 1.3.2.2 on pages 48 to 53 and chapter 2.2 on pages 360 to 394).

In contrast, intaglio printing, as applied for the production of security papers, is based on the use of engraved printing plates having intaglio printing patterns taking the shape of curvilinear patterns the depth of at least part of which typically exceeds 50 microns. These intaglio printing patterns are furthermore inked with high viscosity inks and printing is carried out under high printing pressures, resulting in a characteristic embossing on the printed end-product.

Figure 3:
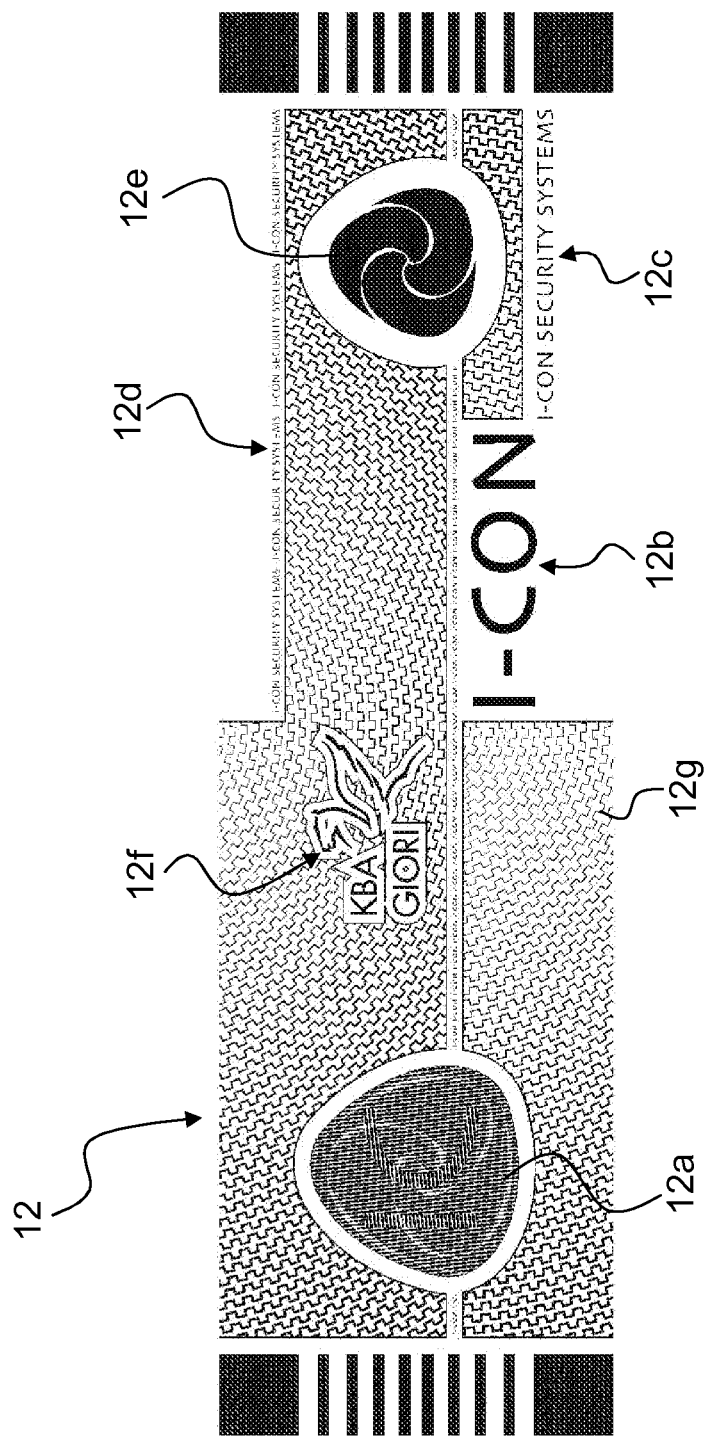
FIG. 3 is an illustration of an exemplary intaglio design for a duty stamp or banderol, which intaglio design consists of multiple design elements that can be produced by direct laser engraving according to the invention.

FIG. 3 illustrates an exemplary intaglio design, designated globally by reference numeral 12, of a duty stamp or banderol that can be produced by direct laser engraving according to the invention. This intaglio design 12 consists of multiple design elements 12a to 12g, including for instance a so-called latent image 12a, texts or like alphanumerical indications in varying sizes 12b, 12c, 12d, large surface patterns 12e with ink retaining structures (not illustrated), logos 12f, and guilloche patterns 12g. Any other patterns or combination thereof could be envisaged, including patterns similar to those found in typical intaglio portraits as depicted in FIGS. 1 and 2.

Figure 4:
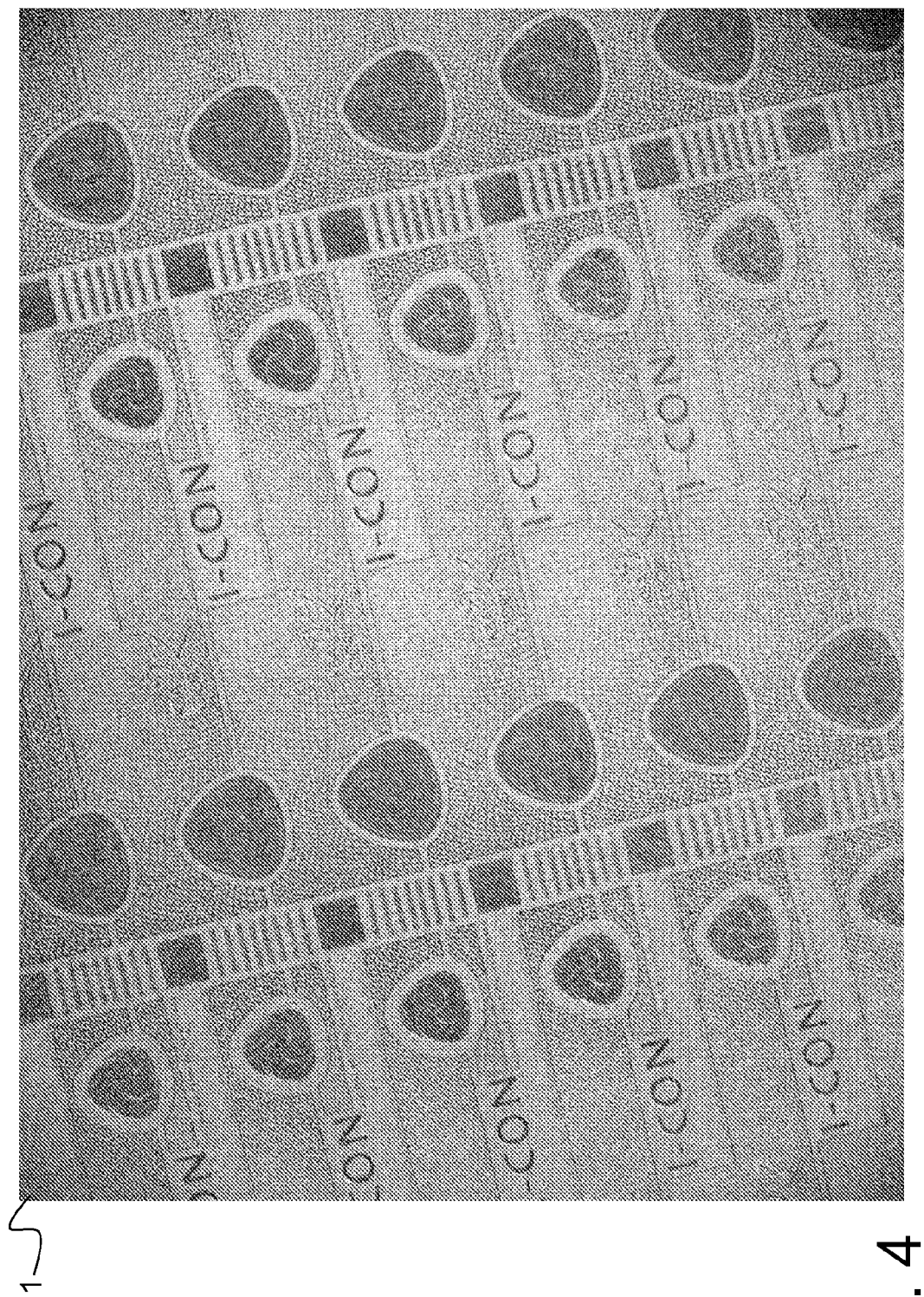
FIG. 4 is a greyscale photograph of a portion of an intaglio printing plate engraved according to the invention wherein multiple intaglio printing patterns as illustrated in FIG. 3 have been engraved on the intaglio printing plate.

The various design elements 12a to 12g of the intaglio-printed pattern of FIG. 3 might be produced by means of a suitable design software, such as the software ONE® marketed by the present Applicant. The engraving profile of each design element 12a to 12g might be defined individually according to parameters selected by the designer to create a so-called original depth-map as discussed in International application No. WO 03/103962 A1. This original depth-map is then replicated digitally as many time as required to form a master depth-map of the intaglio printing plate to engrave. A partial view of the surface of an intaglio printing plate 1 which was engraved on the basis of the intaglio design of FIG. 3 is shown in the greyscale photograph of FIG. 4. The greyscale photograph of FIG. 4 actually shows the mirrored image of the engraved intaglio printing plate 1, it being understood that the intaglio printing patterns that are engraved into the printing plate 1 mirror the intaglio design shown in FIG. 3.

Figure 5A:
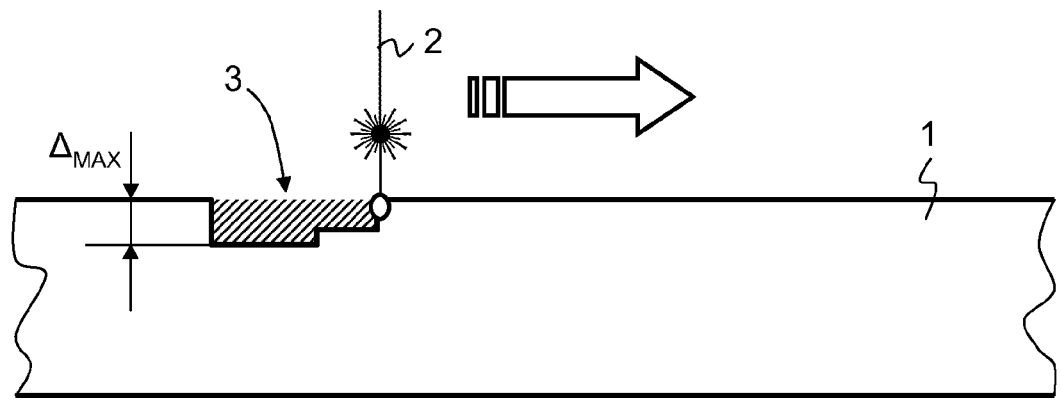
FIGS. 5a and 5b are two schematic illustrations of an individual engraving step and a thereafter following cleaning step according to the invention.

The basic principle of the method according to the invention will now be described in reference to FIGS. 5a and 5b. FIG. 5a schematically illustrates a printing plate medium 1 in the process of being engraved by a laser beam 2 to form engravings 3 in the surface thereof. The hatched area in FIG. 5a is indicative of the material that is being removed by the laser beam 2. The dimensions of the engravings 3 have been exaggerated for the purpose of illustration. As an example, at least part of the intaglio printing patterns 3 can be engraved to a depth of approximately 80 microns. It shall be understood that the depth of the engravings can be as high as 150 (or eventually more), while a typical line width ranges from approximately 10 to 500 microns. Wider line widths or surfaces are possible under the provision that suitable ink retaining structures are formed in the engravings, which ink retaining structures are aimed at preventing the ink from being wiped off from the engraving by the wiping system of intaglio printing presses.

Engraving is preferably performed pixel-by-pixel based on three-dimensional pixel data of an engraving depth-map of the desired intaglio printing patterns as discussed in International application No. WO 03/103962 A1. The printing plate medium 1 is preferably made of or comprises an outer layer made of a metal such as nickel, steel, brass, zinc, chrome or alloys thereof, which materials are all commonly used in the art.

According to the present invention, the printing plate medium 1 is engraved in several individual engraving steps (FIG. 5a illustrates a first one of a series of individual engraving steps) performed one after the other in register so that the intaglio printing patterns are gradually engraved layer by layer into the surface of the printing plate medium 1 up to desired engraving depths. Preferably, each individual engraving step results in a selective removal of a layer of material from the printing plate medium 1 the thickness of which does not exceed a pre-selected maximum value $\Delta_{MAX}$. This maximum value $\Delta_{MAX}$ is preferably of between 10 to 15 microns.

Figure 5B:
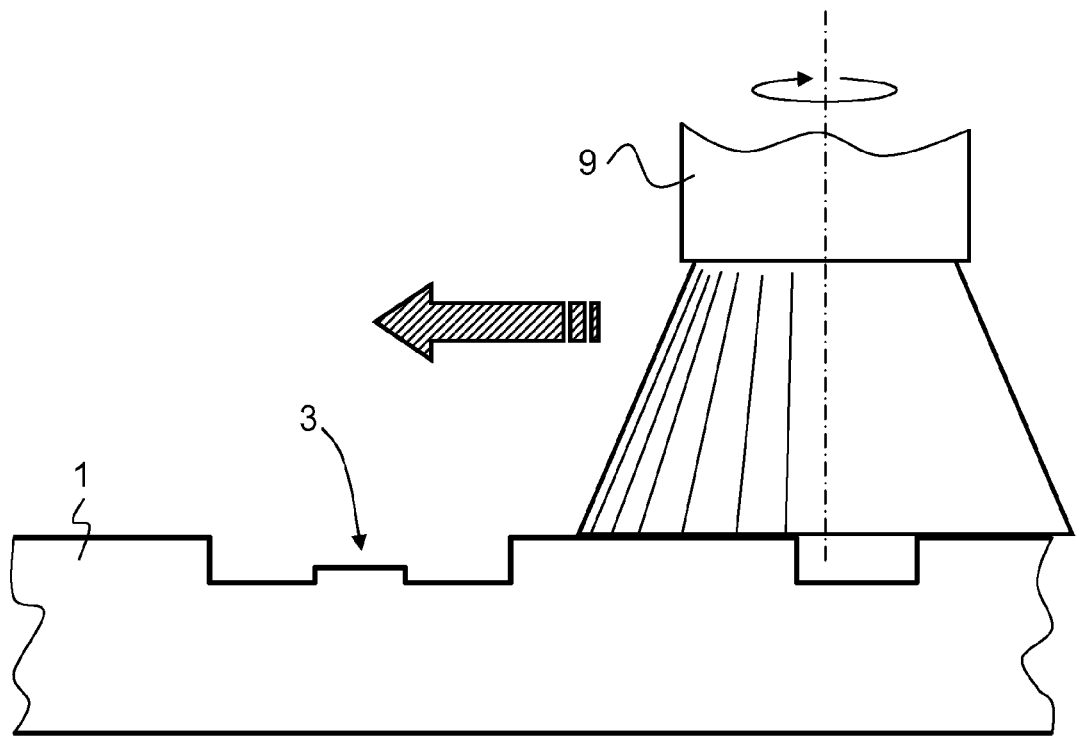

As illustrated schematically by FIG. 5b, the surface of the engraved printing plate medium 1 is cleaned following and between each individual engraving step, i.e. after removal of each layer. Cleaning of the surface of the printing plate medium 1 can conveniently be performed mechanically (i.e. without resorting to the use of aggressive cleaning processes). Such cleaning can advantageously be performed by means of a rotating brush 9 that is moved over the surface of the engraved printing plate medium 1.

As will be appreciated hereinafter, the printing plate medium 1 can advantageously be mounted onto the circumference of a support cylinder which is rotated in front of a movable laser engraving unit producing a laser beam that is directed towards the surface of the printing plate medium 1, which laser engraving unit is movable parallel to the axis of rotation of the support cylinder. In this context, each individual engraving step can conveniently be performed while the laser engraving unit is moved from a start position to an end position step by step along the axis of the support cylinder so as to process successive annular portions of the surface of the printing plate medium and cleaning of the surface of the printing plate medium 1 can be performed while the laser engraving unit, which is inoperative, is moved back from the end position to the start position.

Preferably, the angle of incidence of the laser beam 2 with respect to the surface of the printing plate medium 1 being engraved is kept constant, thereby guaranteeing perfect engraving uniformity throughout the engraving process.

Figure 6:
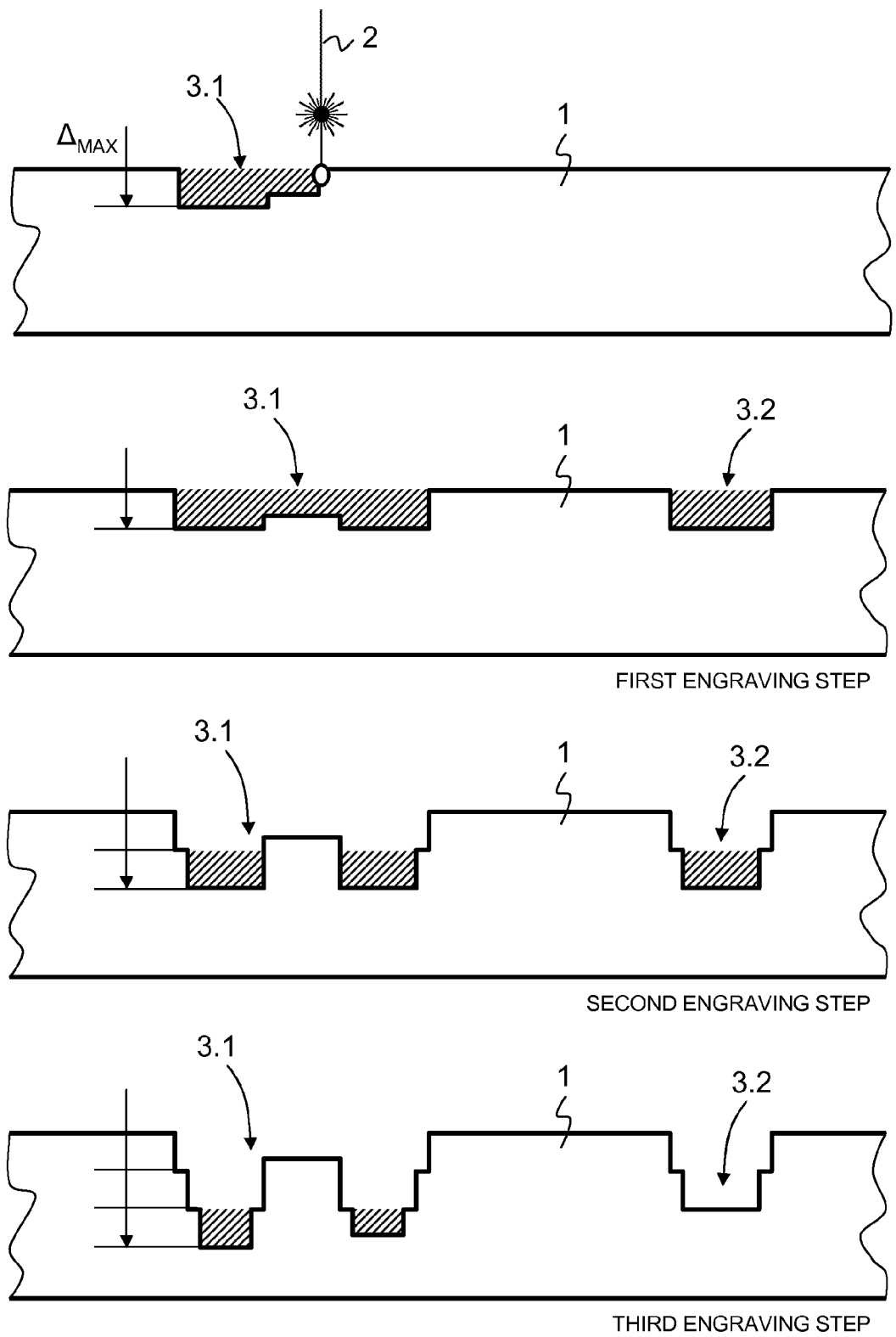
FIG. 6 is a schematic illustration showing a possible sequence of individual engraving steps of an intaglio printing plate according to the invention.

Different sequences of individual engraving steps might be envisaged in the context of the present invention. FIG. 6 illustrates a possible sequence wherein first and second intaglio printing patterns, respectively designated by reference numerals 3.1 and 3.2 are gradually formed layer after layer. A first intaglio printing pattern 3.1 is for instance engraved in three steps by forming a first partial engraving during a first engraving step, deepening the engraving to a second partial engraving during a second engraving step, and ultimately to the final intaglio printing pattern 3.1 during a third engraving step. A shallower intaglio printing pattern 3.2 is similarly engraved in two steps which are performed simultaneously with the first and second partial engravings of the first intaglio printing pattern 3.1, a partial engraving being engraved during the first step and subsequently deepened to the final intaglio printing pattern 3.2 during the second engraving step. The hatched areas in FIG. 6 are again illustrative of the material that is being removed by the laser beam 2 during each engraving step (the same applies to FIG. 7 and FIGS. 8a and 8b which are discussed hereinafter). It shall furthermore be understood that the surface of the printing plate medium 1 is cleaned from residues following and between each individual engraving step.

Figure 7:
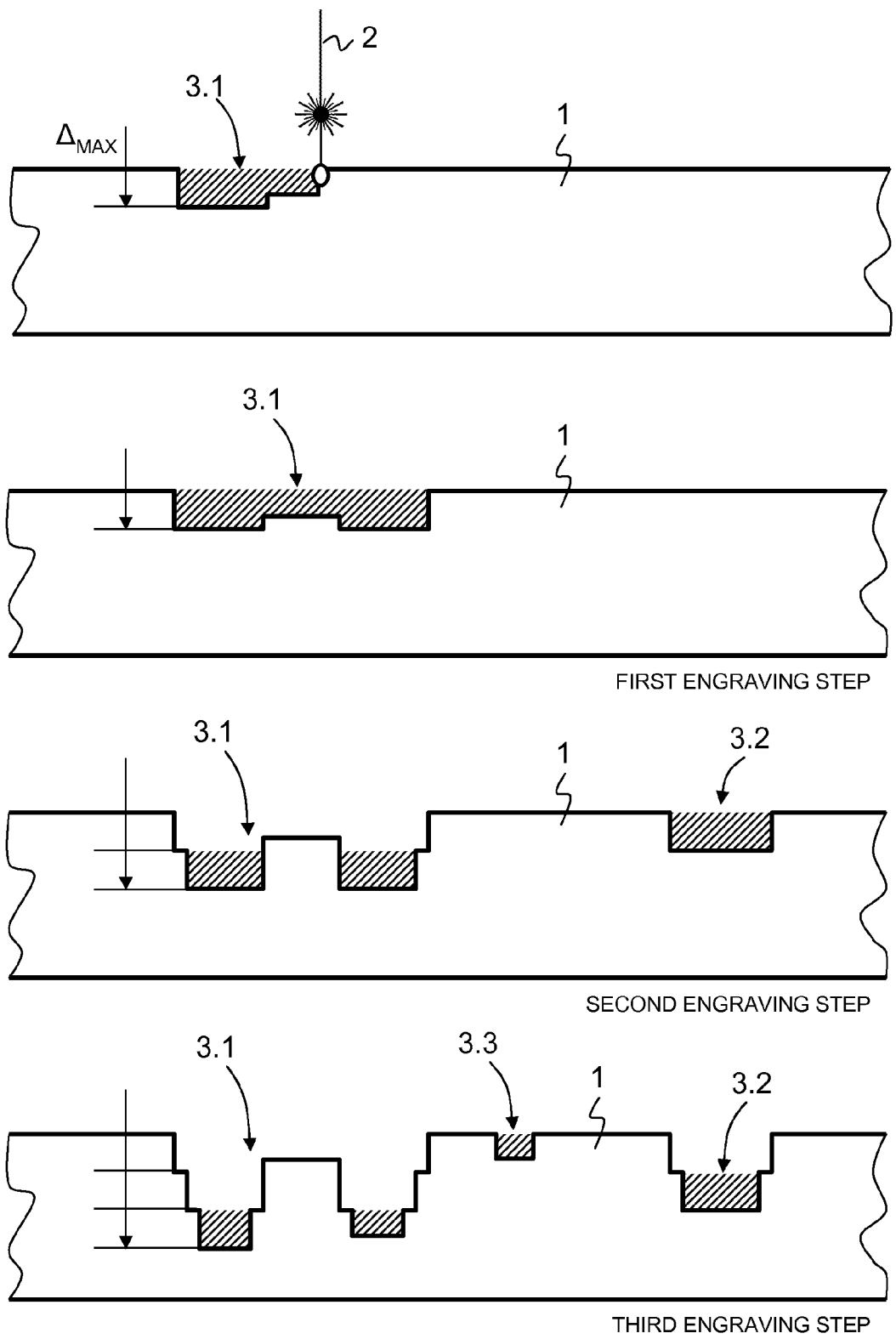
FIG. 7 is a schematic illustration showing another possible sequence of individual engraving steps of an intaglio printing plate according to the invention.

FIG. 7 illustrates another possible sequence wherein layer-by-layer engraving of the surface of the printing plate medium 1 is first performed by starting with the deepest intaglio printing patterns, e.g. intaglio printing pattern 3.1, and gradually adding shallower intaglio printing patterns, e.g. intaglio printing pattern 3.2 followed by intaglio printing pattern 3.3, during subsequent engraving steps. For instance, during the first engraving step, only intaglio printing pattern 3.1 is partially engraved. During the second step, this intaglio printing pattern 3.1 is deepened, while simultaneously forming a partial engraving of intaglio printing pattern 3.2. During the third step, intaglio printing patterns 3.1 and 3.2 are further deepened, while a third shallower intaglio printing pattern 3.3 is formed in the surface of the printing plate medium 1.

As is apparent in FIG. 7, focusing of the laser beam 2 needs to be adjusted in this case during the second and third engraving steps as material is removed at different levels of the printing plate medium 1. This can be performed using an adequate system for adjusting focusing of the laser beam 2 during the engraving steps (such adjustment of the focus of the laser beam 2 would not be necessary during the first engraving step).

Figure 8A:
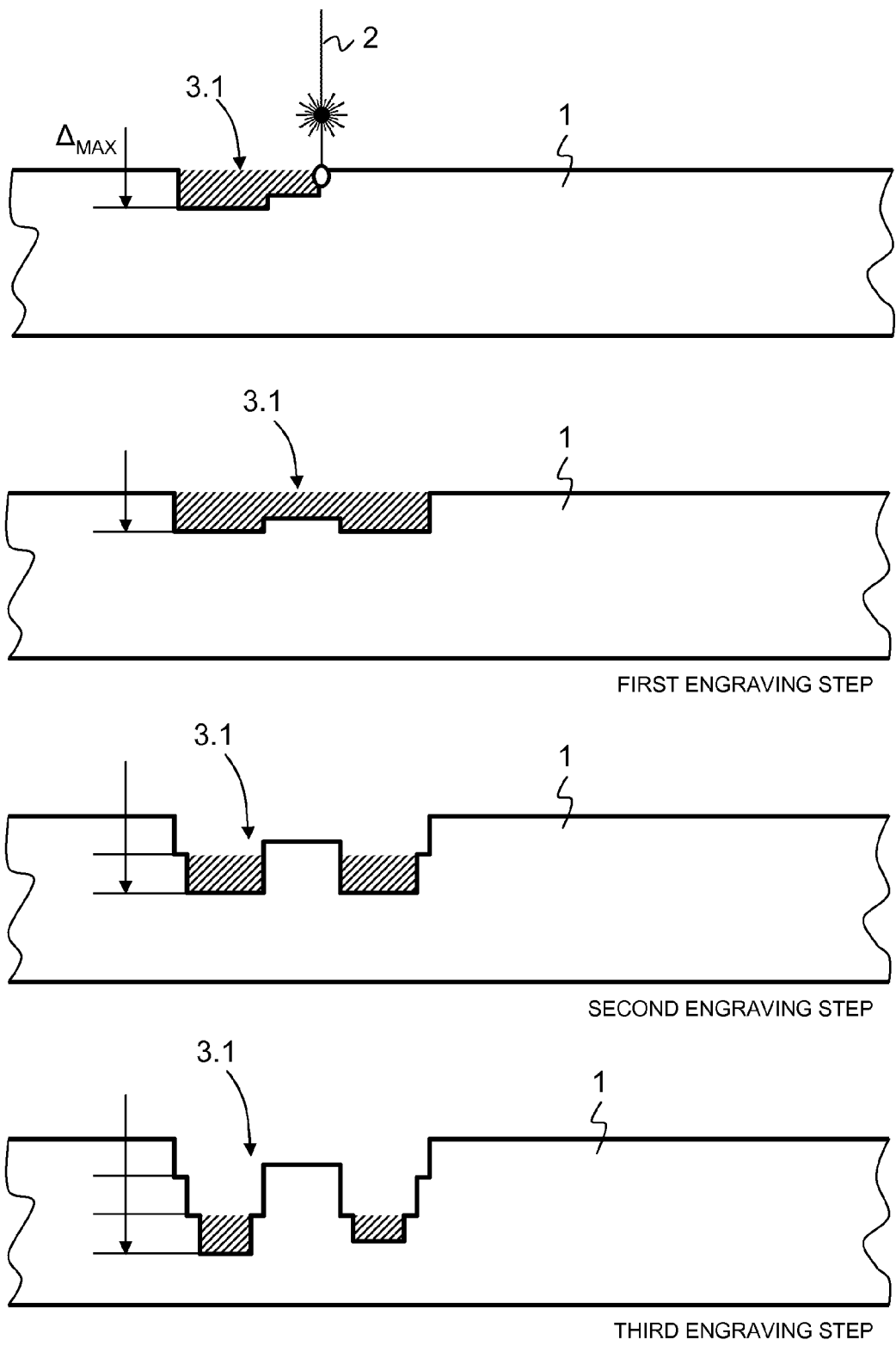
FIGS. 8a and 8b are schematic illustrations showing another possible sequence of individual engraving steps of an intaglio printing plate according to the invention.
Figure 8B:
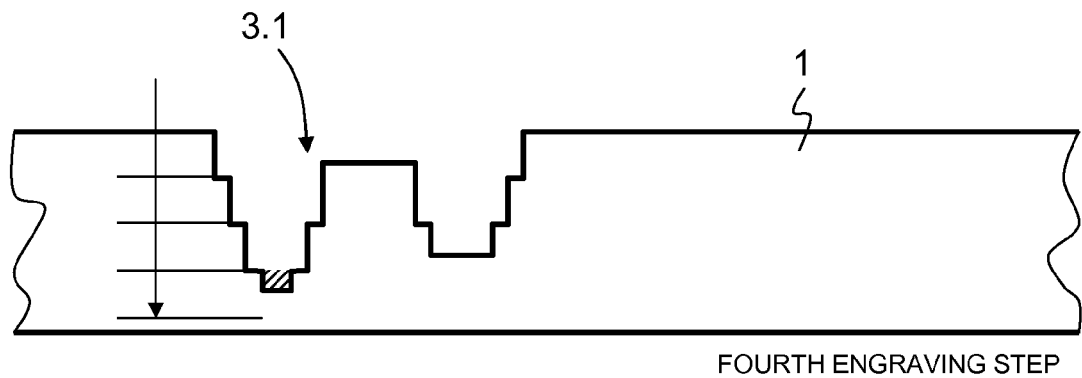
Figure 8B:
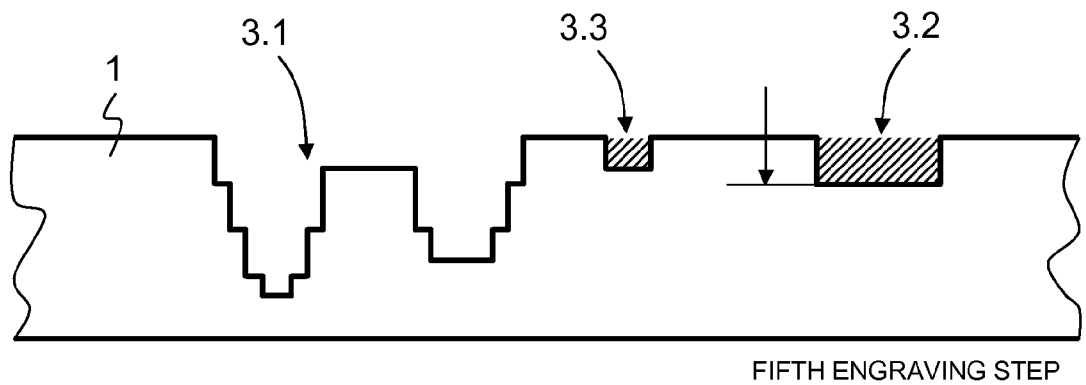
Figure 8B:
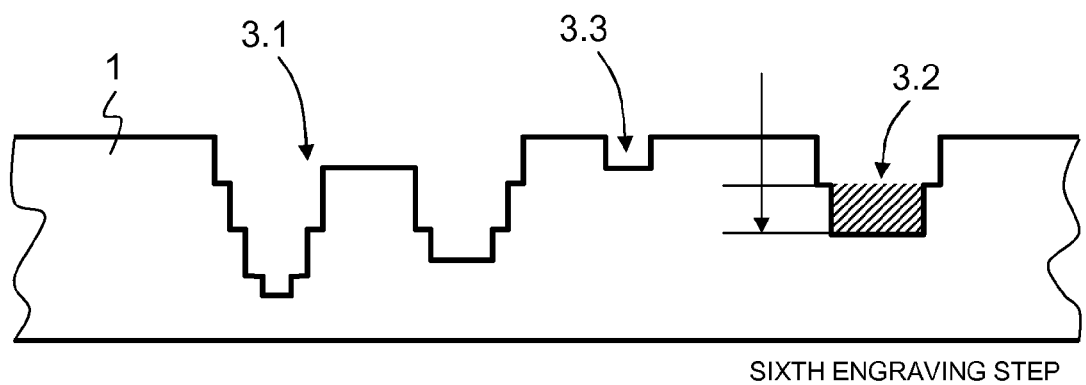

Alternatively, as illustrated in FIGS. 8a and 8b, one may decompose the layer-by-layer engraving sequence into a plurality of engraving phases, each comprising one or more individual engraving steps, whereby only part of the desired intaglio printing patterns are engraved during each engraving phase.

FIGS. 8a and 8b for instance illustrate a case wherein intaglio printing pattern 3.1 is formed during a first engraving phase and intaglio printing patterns 3.2 and 3.3 are formed during a subsequent second engraving phase. More precisely, FIGS. 8a and 8b show that the first, second, third and fourth engraving steps (which first to fourth engraving steps correspond to a first engraving phase) are carried out to form intaglio printing pattern 3.1, while the shallower intaglio printing patterns 3.2 and 3.3 are formed simultaneously during the fifth and sixth engraving steps (which fifth and sixth engraving steps correspond to a second engraving phase). More than two engraving phases can obviously be envisaged.

In contrast to the previous sequence of engraving steps discussed in reference to FIG. 7, the focus of the laser beam 2 does not need to be adjusted during each engraving step, but rather merely from one step to the next as in the case of the sequence of engraving steps of FIG. 6.

The sequences of engraving steps discussed hereinabove in reference to FIG. 7 and FIGS. 8a and 8b might be advantageous in that the shallower and finer intaglio printing patterns are formed during the ultimate stages of the engraving process and are preserved from the repeated cleaning operations.

The sequences of engraving steps discussed hereinabove in reference to FIGS. 6, 7, 8a and 8b are only illustrative of possible engraving sequences. Other sequences of engraving steps might be envisaged.

Figure 9:
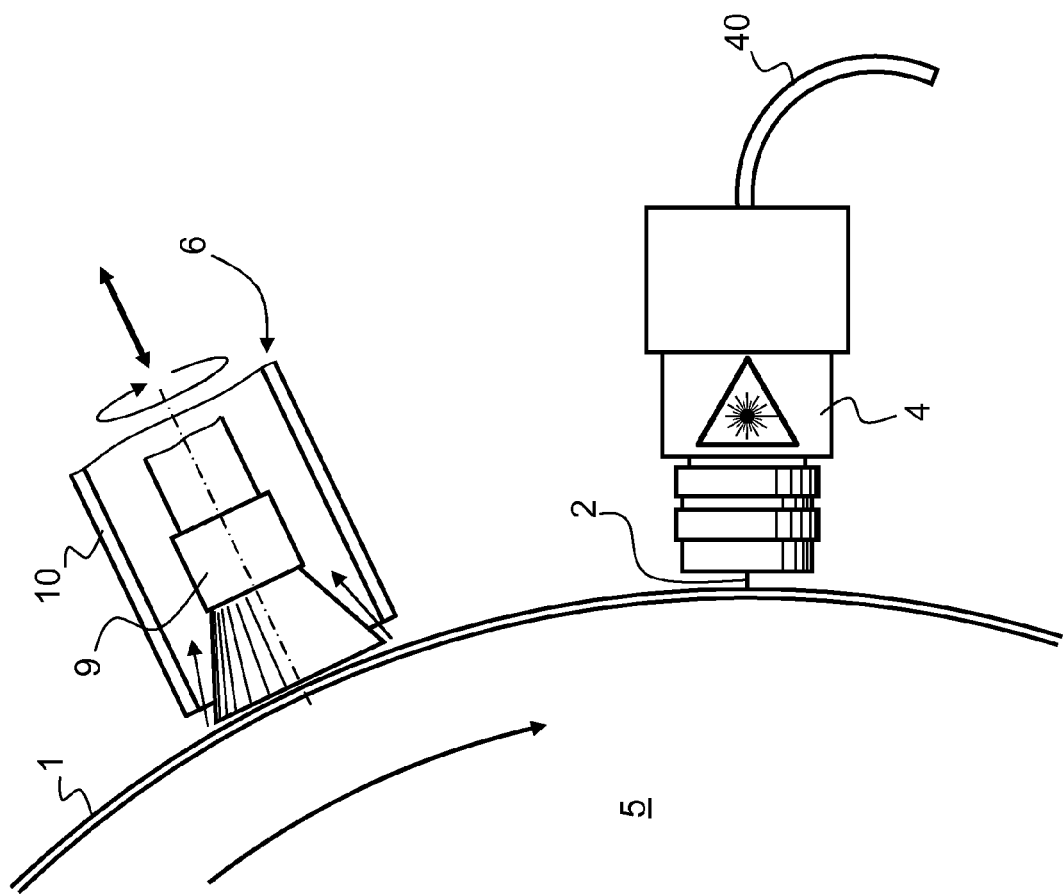
FIG. 9 is a schematic side view of a laser engraving system to carry out the method of the invention.

FIG. 9 is a schematic partial side view of a laser engraving system to carry out the method of the invention. As already mentioned, the printing plate medium 1 is preferably mounted on the circumference of a support cylinder 5 (see also FIG. 10) which is rotated in front of a movable engraving unit 4 producing a laser beam 2 that is directed towards the surface of the printing plate medium 1, which laser engraving unit 4 is movable parallel to the axis of rotation O of the support cylinder 5.

The laser engraving unit 4 can be any type of suitable laser engraving unit, for instance a Ytterbium fiber laser unit. The laser can conveniently be supplied from a laser source (not illustrated) to a laser head of the unit 4 via an optical fibre cable 40. The laser engraving unit 4 is mounted on a frame (not illustrated in FIG. 10) that is movable parallel to the axis of rotation O of the cylinder 5 between a start position (illustrated on the left-hand side in FIG. 10) and an end position, designated by reference numeral 4*(on the right-hand side in FIG. 10).

The laser engraving unit 4 is movable during each individual engraving step from the start position to the end position (e.g. from left to right in FIG. 10) step by step along the axis of rotation O of the support cylinder 5 so as to process successive annular portions of the surface of the printing plate medium 1.

A cleaning unit, designated globally by reference numeral 6, is preferably mounted by means of a supporting arm (not shown) on the same frame as the laser engraving unit 4 so as to move together with this latter. The supporting arm is designed to enable movement of the cleaning unit 6 between a working position (as illustrated in FIG. 9) where the cleaning unit 6 is brought into contact with the surface of the printing plate medium 1 carried on the support cylinder 5 and a retracted, inoperative position (not illustrated) where the cleaning unit 6 is moved away from the surface of the printing plate medium 1. The cleaning unit 6 is preferably operative while the laser engraving unit 4, which is inoperative, is moved back from the end position to the start position, e.g from right to left in FIG. 10. Other arrangements for mounting of the cleaning unit 6 can however be envisaged, including arrangements wherein the cleaning unit 6 and the laser engraving unit 4 are mounted on separate frames and/or arrangements wherein the cleaning unit 6 is retractable, for instance through rotation of the cleaning unit 6 towards and away from the surface of the printing plate medium 1 carried by the support cylinder 5.

The cleaning unit 6 preferably comprises a rotating brush 9 for brushing the surface of the printing plate medium 1. The cleaning unit 6 may advantageously be further provided with an aspiration head 10 for aspirating the residues that are removed from the surface of the printing plate medium 1. In this example, the rotating brush 9 is located within the aspiration head 10 so that residues can be conveniently aspirated from all areas surrounding the rotating brush 9.

A rotational speed of the brush 9, pressure between the brush 9 and the surface of the printing plate medium 1 and/or displacement speed of the cleaning unit 6 parallel to the axis of rotation O of the support cylinder 5 is/are advantageously adjustable so as to ensure optimum cleaning efficiency.

In the system of FIGS. 9 and 10, the printing plate medium 1 is advantageously engraved while being held on the support cylinder 5 in the same way as it would be held on the circumference of a plate cylinder of an intaglio printing press. This ensures that the engraving profile of the engravings remains substantially unchanged when the engraved printing plate medium 1 is ultimately installed in an intaglio printing press, which is an advantageous over a solution as disclosed in International application No. WO 97/48555 A1, European patent application No. EP 1 334 822 A2, International application No. WO 2006/045128 A1 or Deinhammer2006 where the printing plate medium 1 is engraved while being held flat. For the sake of completeness, intaglio printing presses are disclosed in European patent applications Nos. EP 0 091 709 A1, EP 0 351 366 A2, EP 0 406 157 A1, EP 0 415 881 A1, EP 0 563 007 A1, EP 0 683 123 A1, EP 0 873 866 A1, EP 1 400 353 A1, EP 1 442 878 A1, EP 1 445 098 A1, EP 1 448 393 A1 (WO 03/047862 A1), EP 1 580 015 A1, EP 1 602 482 A1, EP 1 602 483 A1, EP 1 622 769 A1 (WO 2004/101282 A1) and EP 1 704 052 A1 (WO 2005/077656 A1), all in the name of the present Applicant.

Various modifications and/or improvements may be made to the above-described embodiments without departing from the scope of the invention as defined by the annexed claims. For instance, while the above-discussed embodiment of the laser engraving system comprises a rotatable support cylinder on the circumference of which the laser-engravable printing plate medium is mounted, the invention is equally applicable to engraving systems making use of a flat x-y table.

The invention claimed is:

1. A method for manufacturing intaglio printing plates for the production of security papers, wherein a laser beam produced by a laser engraving unit is used to engrave intaglio printing patterns directly into a surface of a laser-engravable printing plate medium, wherein laser engraving of the printing plate medium is carried out layer by layer in several individual engraving steps performed one after the other in register so that the intaglio printing patterns are gradually engraved into the surface of the printing plate medium up to desired engraving depths, the surface of the engraved printing plate medium being cleaned from residues of the laser engraving process following and between each individual engraving step while the laser engraving unit is inoperative, wherein the laser beam produced by the laser engraving unit is directed towards the surface of the printing plate medium, the laser engraving unit being moved during each individual engraving step from a start position to an end position over the surface of the printing plate medium, and wherein cleaning of the surface of the engraved printing plate medium is performed while the laser engraving unit, which is inoperative, is moved back from the end position to the start position.

2. The method according to claim 1, wherein each individual engraving step results in a selective removal of a layer of material from the printing plate medium the thickness of which does not exceed a pre-selected maximum value.

3. The method according to claim 2, wherein the pre-selected maximum value is of between 10 to 15 microns.

4. The method according to claim 1, wherein at least part of the intaglio printing patterns are engraved to a depth of at least 80 microns.

5. The method according to claim 1, wherein cleaning of the surface of the engraved printing plate medium following and between each individual engraving step is performed mechanically.

6. The method according to claim 5, wherein cleaning of the surface of the engraved printing plate medium following and between each individual engraving step is performed by means of a rotating brush that is moved over the surface of the engraved printing plate medium following and between each individual engraving step.

7. The method according to claim 1, wherein each engraving step involves a pixel-by-pixel engraving of the printing plate medium based on three-dimensional pixel data of an engraving depth-map of the intaglio printing patterns.

8. The method according to claim 1, wherein the printing plate medium is mounted onto the circumference of a support cylinder which is rotated in front of the laser engraving unit, the laser engraving unit being movable parallel to the axis of rotation of the support cylinder, wherein the laser engraving unit is moved during each individual engraving step from the start position to the end position step by step along the axis of rotation of the support cylinder so as to process successive annular portions of the surface of the printing plate medium.

9. The method according to claim 1, wherein engraving of the surface of the printing plate medium is first performed by starting with the deepest intaglio printing patterns and gradually adding shallower intaglio printing patterns during subsequent engraving steps.

10. The method according to claim 9, wherein a focus of the laser beam is adjusted during at least one of the individual engraving steps.

11. The method according to claim 9, wherein a focus of the laser beam is not adjusted during the individual engraving steps and wherein engraving of the surface of the printing plate medium is decomposed into a plurality of engraving phases, each comprising one or more individual engraving steps, whereby only part of the desired intaglio printing patterns are engraved during each engraving phase.

12. The method according to claim 1, wherein an angle of incidence of the laser beam with respect to the surface of the printing plate medium remains constant throughout the engraving process.

13. The method according to claim 1, wherein the printing plate medium is a metallic printing plate medium.

14. A laser engraving system for manufacturing intaglio printing plates for the production of security papers, comprising a support element for mounting a laser-engravable printing plate medium, a laser engraving unit producing a laser beam that is directed towards a surface of the printing plate medium for engraving intaglio printing patterns directly into the surface of the printing plate medium layer by layer in several individual engraving steps and a cleaning unit for cleaning the surface of the engraved printing plate medium and removing residues therefrom following and between each individual engraving step while the laser engraving unit is inoperative, wherein the laser engraving unit is movable during each individual engraving step from a start position to an end position over the surface of the printing plate medium, and wherein the cleaning unit is operative while the laser engraving unit, which is inoperative, is moved back from the end position to the start position.

15. The laser engraving system according to claim 14, wherein the printing plate medium is mounted onto the circumference of a support cylinder acting as the support element, which support cylinder is rotated in front of the laser engraving unit, which laser engraving unit is movable parallel to the axis of rotation of the support cylinder.

16. The laser engraving system according to claim 15, wherein the laser engraving unit is movable during each individual engraving step from the start position to the end position step by step along the axis of rotation of the support cylinder so as to process successive annular portions of the surface of the printing plate medium.

17. The laser engraving system according to claim 14, wherein the laser engraving unit and the cleaning unit are mounted on a common frame that is movable with respect to the surface of the printing plate medium.

18. The laser engraving system according to claim 14, wherein the cleaning unit comprises a rotatable brush that can be brought into contact with the surface of the engraved printing plate medium to mechanically remove residues from the engraved printing plate medium.

19. The laser engraving system according to claim 14, wherein the cleaning unit is designed to perform a mechanical cleaning of the surface of the engraved printing plate medium following and between each individual engraving step.

20. The laser engraving system according to claim 14, wherein the laser engraving unit is controllable to selectively remove, during each individual engraving step, a layer of material from the printing plate medium, the thickness of which does not exceed a pre-selected maximum value.

21. The laser engraving system according to claim 20, wherein the pre-selected maximum value is of between 10 to 15 microns.

22. The laser engraving system according to claim 14, wherein the laser engraving unit is controllable to perform a pixel-by-pixel engraving of the printing plate medium based on three-dimensional pixel data of an engraving depth-map of the intaglio printing patterns.

* * * * *